Feb. 14, 1939.                    G. BARROW                    2,147,188
                                   AIRCRAFT
                              Filed Nov. 18, 1937            2 Sheets-Sheet 2
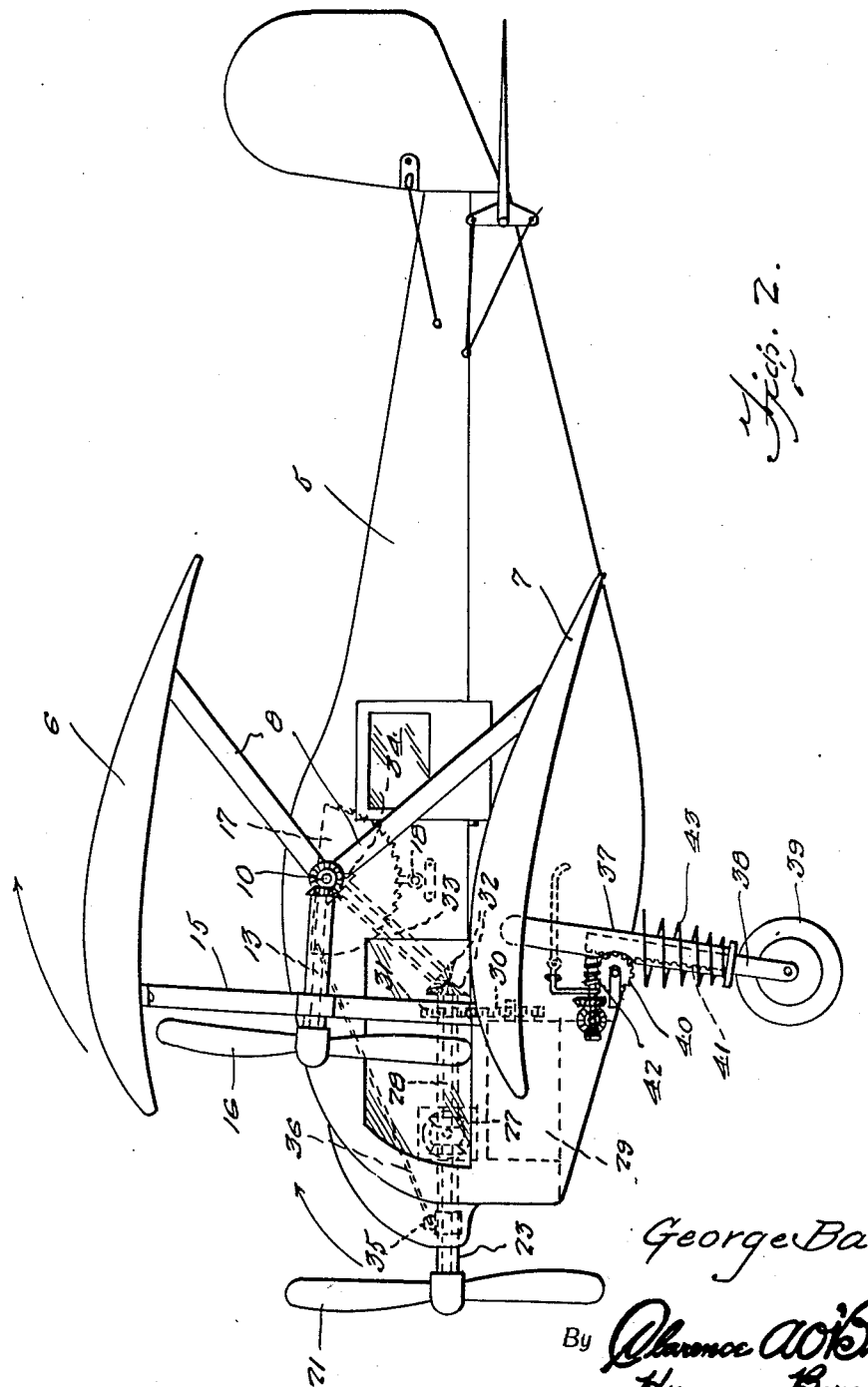
Inventor
George Barrow
By Clarence A. O'Brien
Hyman Berman
Attorneys Patented Feb. 14, 1939

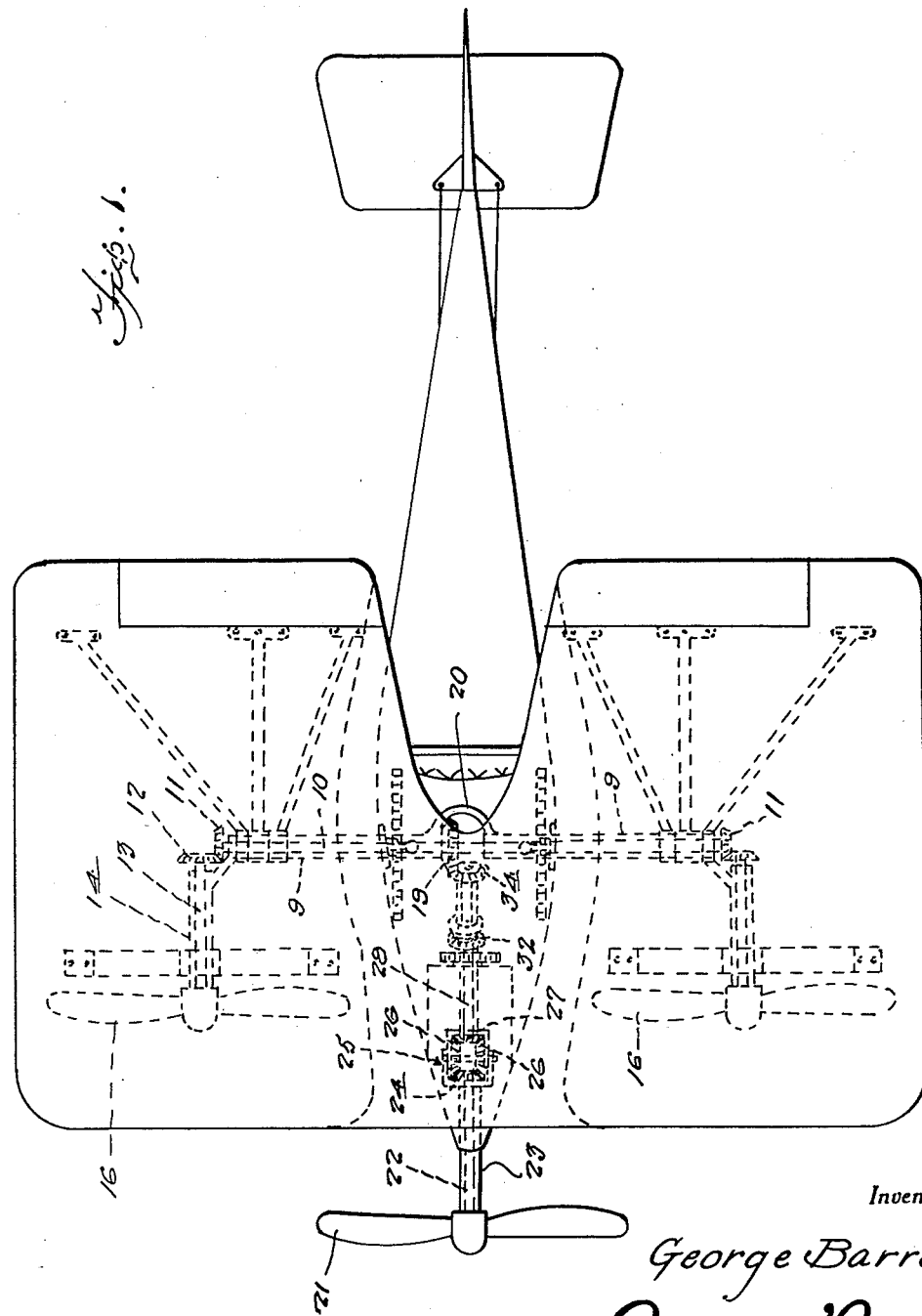

2,147,188

UNITED STATES PATENT OFFICE 2,147,188

AIRCRAFT

George Barrow, Santa Monica, Calif.

Application November 18, 1937, Serial No. 175,334

2 Claims. (Cl. 244—7)

This invention appertains to new and useful improvements in the general art of aeronautics and more particularly to an aeroplane.

The principal object of the present invention is to provide an aircraft wherein the wings and propellers are adjustable for steep ascent and descent.

Another important object of the invention is to provide an aircraft as well adapted for vertical flight as for horizontal flight.

Other important objects and advantages of the invention will become apparent to the reader of the following specification.

In the drawings:—

Figure 1 represents a top plan view of the aircraft.

Figure 2 is a side elevational view.

Referring to the drawings wherein like numerals designate like parts, it can be seen that the numeral 5 represents the fuselage. Numeral 6 represents the top wing structure. This top wing structure is of integral construction extending entirely across the top of the fuselage and to each end portion of this wing structure is an under wing 7 connected by struts 8 to a corresponding sleeve 9. The sleeves 9 extend through the side walls of the fuselage and through these sleeves extend the shaft 10, which shaft is equipped with beveled gears 11 at the ends thereof. These beveled gears 11 mesh with beveled gears 12 on propeller shafts 13. These shafts extend through sleeves 14 which are clamped in place on front struts 15. Each shaft 13 has a propeller 16 at its forward end.

The inner ends of the sleeves 9 are provided with semi-circular ratchet structures 17 with which a manually controlled pawl 18 is engageable. It can also be seen, that the inner ends of the sleeves 9 are spaced to accommodate the bevel gear 19 on the intermediate portion of the shaft 10, and these sleeves 9 are bridged together as at 20 so that they will operate in unison.

Obviously whenever the sleeves are rotated, both wings 6—7 as well as the propeller 16 are carried therewith so that the wings and propellers can be set at any angle desired depending upon the ascent or descent to be taken.

The forward propeller 21 which is located on the shaft 22 extending through the sleeve 23 is also vertically movable, the inner end of the shaft 22 having the gear 24 in the differential 25. The differential 25 also includes the side bevel gears 26—26 and the rear bevel gear 27 on the forward end of the shaft 28. The motor 29 through the gears 30—31 drives the shaft 28 upon which the gear 27 is located and also by way of the bevel gears 32, the shaft 33 which has the gear 34 meshing with the bevel gear 19 on the shaft 10.

From a collar 35 on the sleeve 23, a rod 36 extends to each of the ratchets 17 so that when these ratchets are manually operated to tilt the wings 6—7 along with the propellers 16, the propeller 21 and its shaft and the sleeve 23 will be inclined accordingly.

Depending housings 37 are provided for the shank 38 of the landing wheels 39, and these wheels can be retracted by rotating the gears 40 operating on the racks 41 of the said shanks 38. Suitable worm drive gears 42 and clutch means may be employed to retract these wheels 39 against the tension of the springs 43 which also serve as shock absorbing means.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. An aeroplane structure including a fuselage carrying a power source, an upper wing extending transversely of and in a plane above the fuselage, lower wings at the sides of the fuselage and underlying the upper wing, rear V-shaped struts connecting the upper and lower wings, vertically arranged front struts connecting the upper and lower wings, a shaft extending through opposite sides of said fuselage and journaled therein between the upper and lower wings, connected sleeves journaled on the shaft and having the apexes of the V-shaped struts secured thereon, toothed segments secured on the sleeves, releasible means engaging the segments for securing the wings at different inclinations with respect to the fuselage, horizontally disposed sleeves supported by the front struts and extending forwardly and rearwardly thereof, propeller shafts journaled in the latter-named sleeves, propellers secured to said propeller shafts, means connecting the propeller shafts to the first-named shaft, and means connecting the first-named shaft to the power source.

2. An aeroplane structure including a fuselage carrying a power source, an upper wing extending transversely of and in a plane above the fuselage, lower wings at opposite sides of the fuselage and underlying the upper wing, rear V-shaped struts connecting the upper and lower wings, vertically arranged front struts connecting the upper and lower wings, a shaft extending through opposite sides of the fuselage and journaled therein between the upper and lower wings, connected sleeves journaled on the shaft and having the apexes of the V-shaped struts secured thereon, toothed segments secured on the sleeves, releasible means engaging the segments for securing the wings at different inclinations with respect to the fuselage, horizontally disposed sleeves supported by the front struts and extending forwardly and rearwardly thereof, propeller shafts journaled in the latter-named sleeves, means connecting the propeller shafts to the first-named shaft, propellers secured to the propeller shafts, means connecting the first-named shaft to the power source, a propeller shaft mounted for upward and downward pivotal movement on the fuselage, means connecting the latter-named propeller shaft to said power source, and means for connecting the latter-named propeller shaft to one of said segments to bring about pivotal movement of the latter-named propeller shaft in accordance with the inclining of the wings with respect to the fuselage.

GEORGE BARROW.